May 18, 1926.

E. E. WAITE 1,585,135

APPARATUS FOR PRODUCING ENDED CORDS

Filed Feb. 28, 1924    4 Sheets-Sheet 1

INVENTOR
E. E. WAITE.

ATTORNEYS

May 18, 1926.
E. E. WAITE
1,585,135
APPARATUS FOR PRODUCING ENDED CORDS
Filed Feb. 28, 1924
4 Sheets-Sheet 2
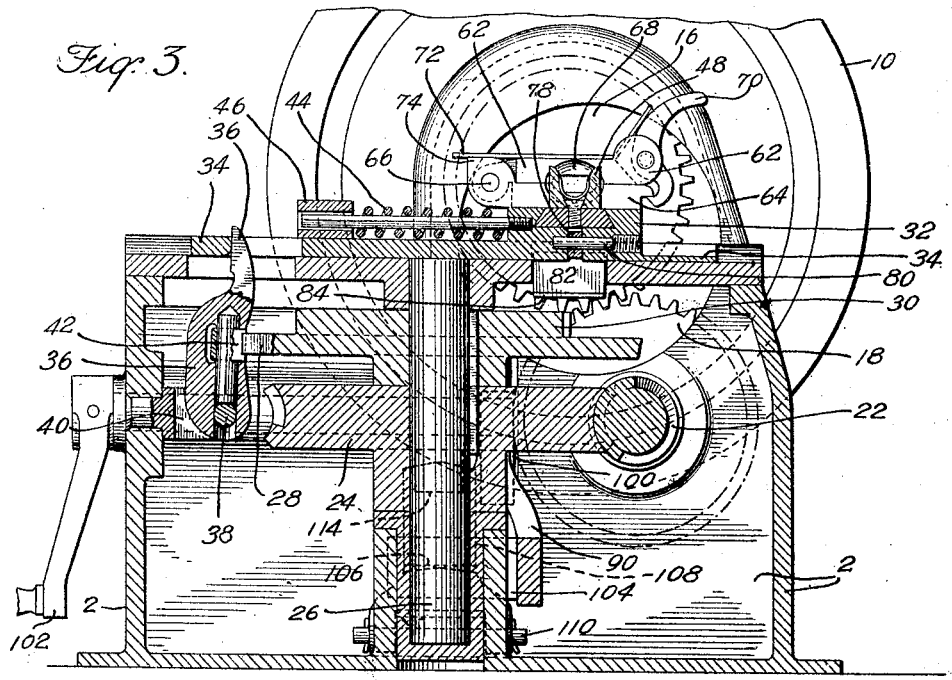
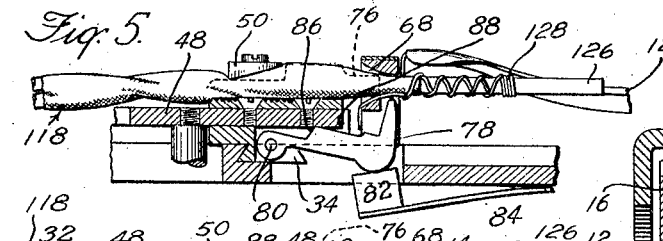
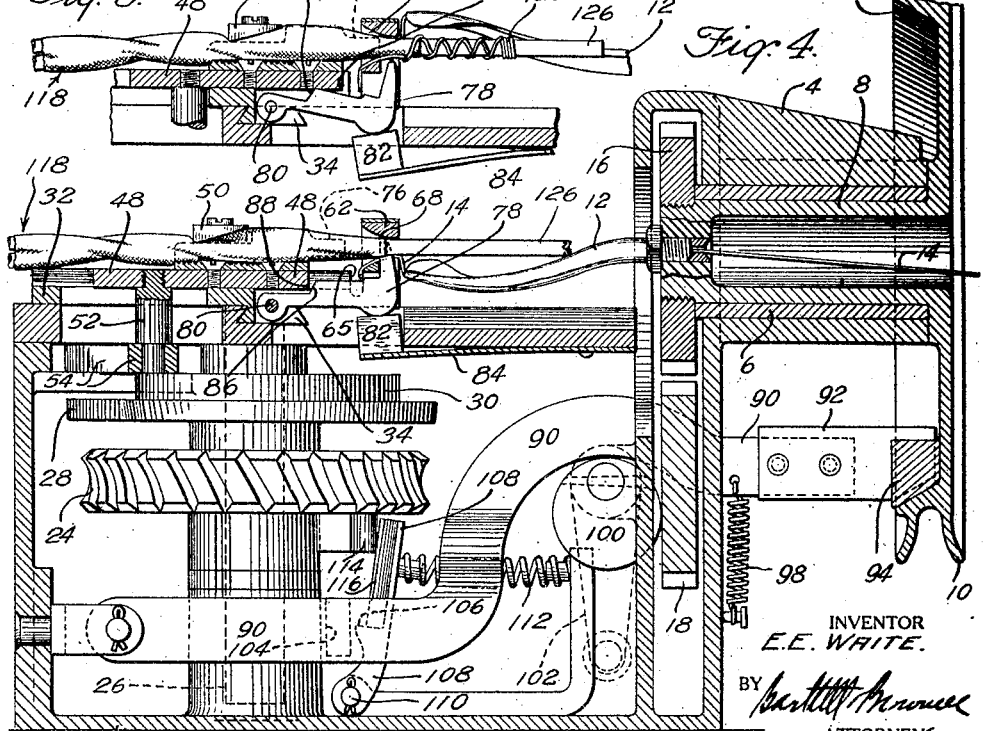
INVENTOR
E.E. WAITE.
BY
ATTORNEYS

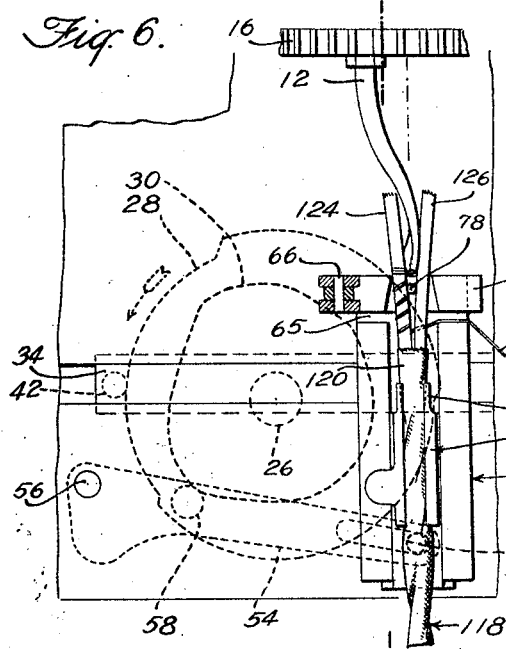
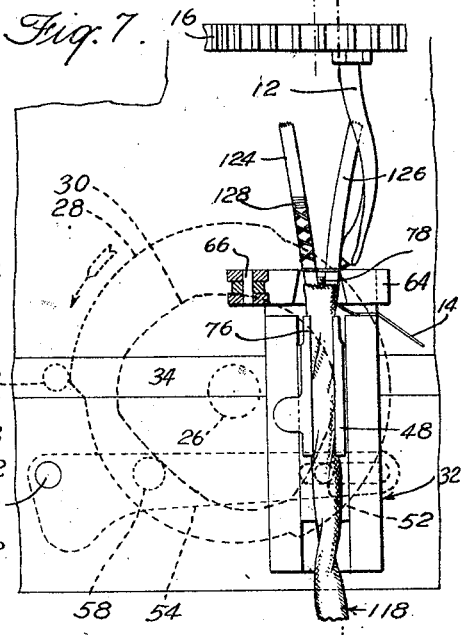
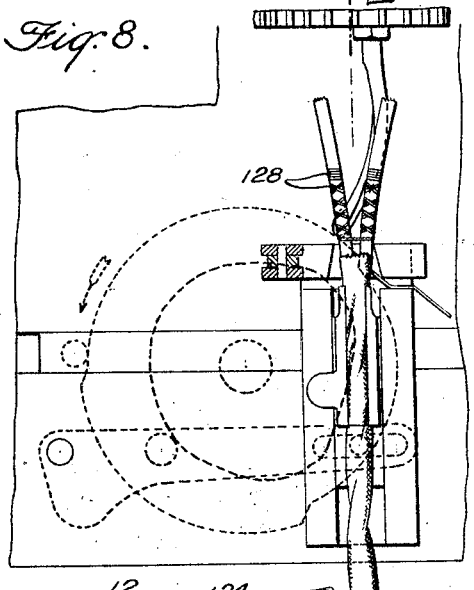
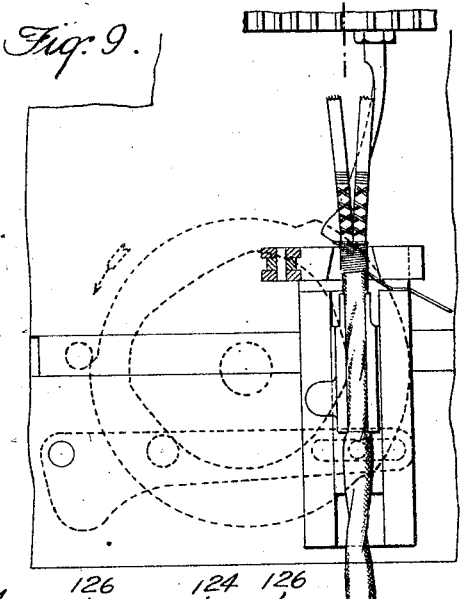
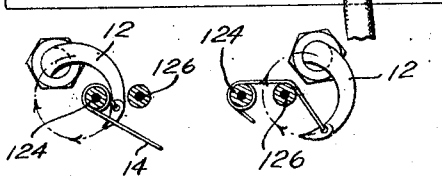
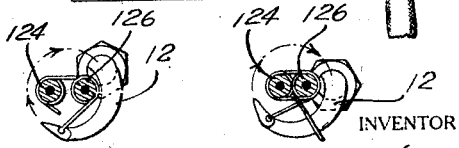

May 18, 1926.

E. E. WAITE

APPARATUS FOR PRODUCING ENDED CORDS

Filed Feb. 28, 1924 4 Sheets-Sheet 4

INVENTOR
E. E. WAITE.
BY
ATTORNEYS

Patented May 18, 1926.

1,585,135

UNITED STATES PATENT OFFICE.

EDWIN E. WAITE, OF FRAMINGHAM, MASSACHUSETTS, ASSIGNOR TO DRIVER-HARRIS COMPANY, OF HARRISON, NEW JERSEY, A CORPORATION OF NEW JERSEY.

APPARATUS FOR PRODUCING ENDED CORDS.

Application filed February 28, 1924. Serial No. 695,638.

My invention relates to an apparatus for winding ended cords, more especially a conducting cord having two separated end portions wound so as to secure the fibers of the insulation about the conductors and prevent them from unravelling or loosening.

It has for its object to make it possible to perform by a machine work heretofore done by hand. It further has for its object to produce an apparatus whereby this work can be done much more expeditiously so as to save both time and labor. It further has for its object to provide a machine made multiple strand conducting cord with a winding progressing successively to several free ends. It further has for its object to supply the machine made multiple strand conducting cord end with a winding which partly embraces all members of the cord near its end and extends separately on to the free ends. It further has for its object to attain other advantages hereinafter pointed out.

The following is a description of my invention, reference being had to the accompanying drawings, in which, Fig. 1 shows a plan view of the apparatus with its clamping and guide devices shown in open position ready to receive a cord to be wound;

Fig. 3 is an enlarged vertical section, substantially on the line 3—3, Fig. 1, showing the guide in closed position;

Fig. 4 is a longitudinal section on the line 4—4, Fig. 1, with the clamp and guide in closed position and a cord inserted within the same;

Fig. 5 is a detail view taken on the same line as Fig. 4, showing certain parts in another position;

Figs. 6 to 9 inclusive are diagrammatic plan views showing various parts of the apparatus in differing operative relations;

Fig. 6 shows the position where the apparatus is about to complete the forward winding of the left leg portion;

Fig. 7 shows the parts after the apparatus has completed both the forward and backward winding of said first leg portion and is about to start about the winding of the right leg portion;

Fig. 8 shows the parts as they are in position upon completion of the forward and rearward winding of the right leg portion; and Fig. 9 shows the parts as they are after having wound both leg portions and the body portion, this position being the initial or starting position, and also a completely wound cord end.

Figs. 6ª to 9ª are detail views further illustrating the winding action showing certain parts in the positions corresponding respectively to Figs. 6 to 9.

Figure 10:
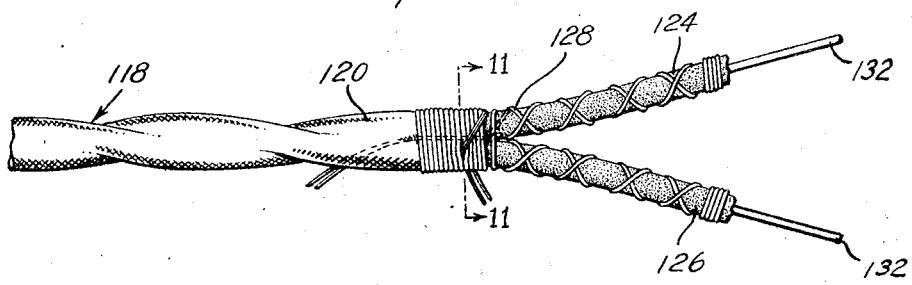

Fig. 10 shows the completely wound cord removed from the apparatus and with its free end secured.

Figure 11:
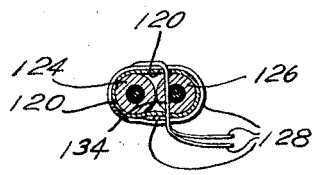

Fig. 11 is a section on the line 11—11, Fig. 10; and

Figure 12:
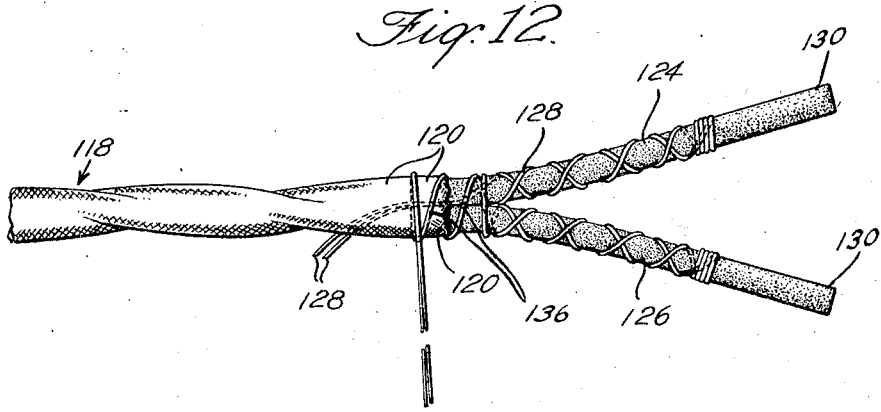

Fig. 12 is a view showing the winding partially completed.

Referring more particularly to the drawings, 2 is the base of the winding apparatus having an offset 4 having affixed therein a bushing 6 which forms a bearing for a hollow shaft 8 driven by the grooved pulley 10. This hollow shaft carries a curved needle 12 screwed therein and through which passes a thread 14 which is to be wound upon the cord. The thread is preferably composed of two parallel strands. The shaft 8 has secured upon its inner end a gear 16 which meshes with a gear 18 mounted upon the shaft 20 journaled in the base and carrying a worm 22 which engages a worm wheel 24 secured to a vertical shaft 26 supported in suitable top and bottom bearings. This shaft 26 carries cams 28 and 30 which are splined thereto so as to rotate therewith and with the worm gear 24, these cams acting to produce certain compound movements of slides hereinafter described.

Figure 1:
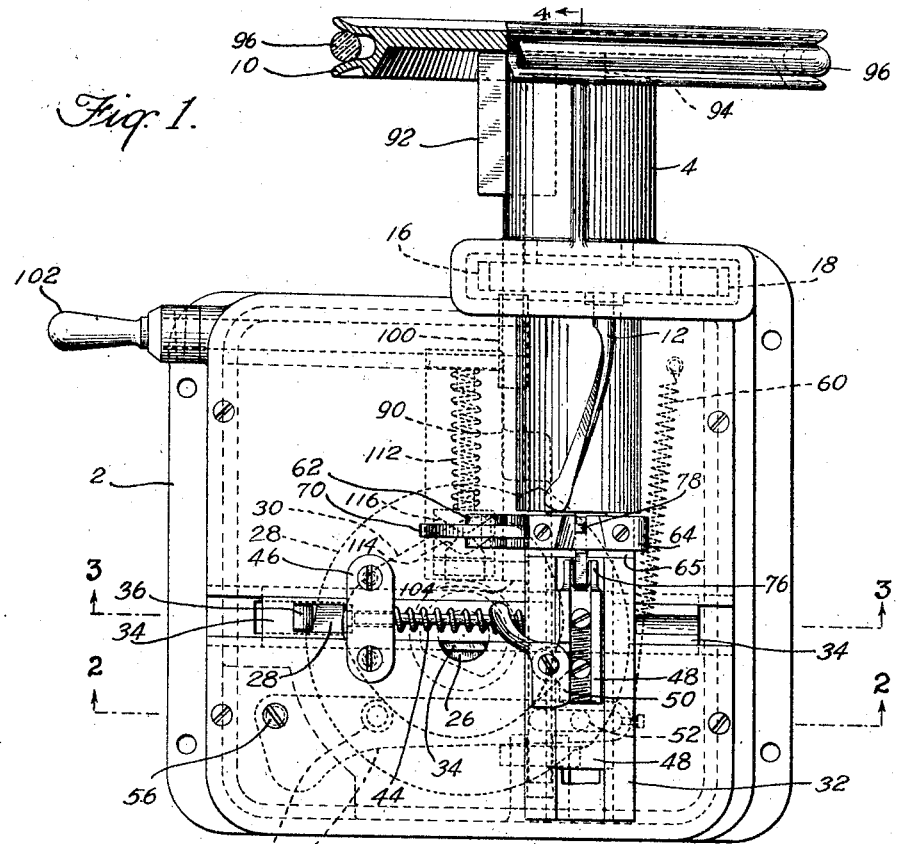
Figure 2:
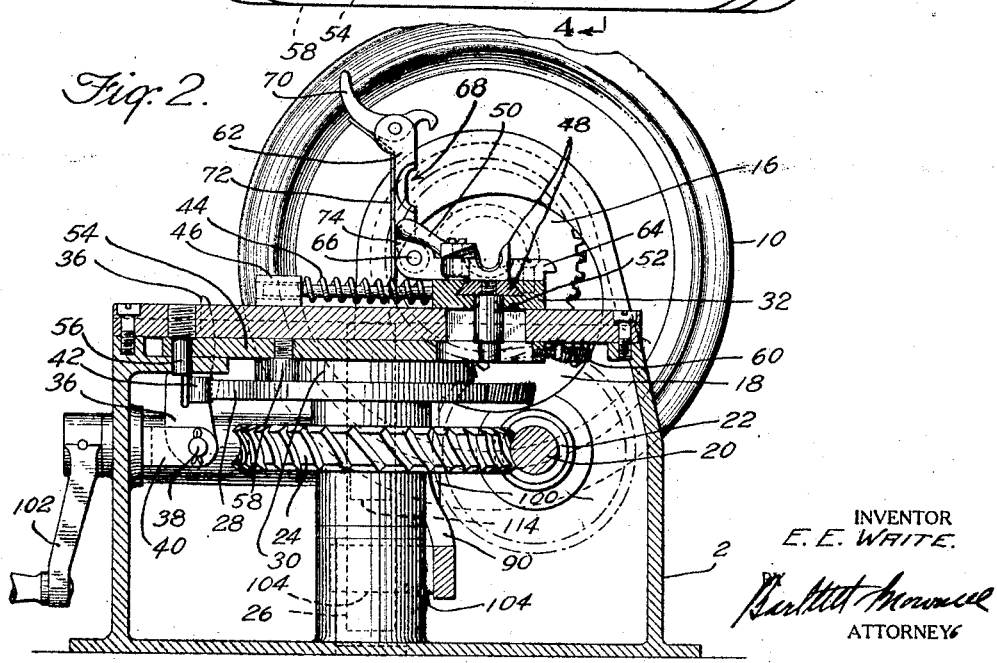
Fig. 2 is a vertical section on the line 2—2, Fig. 1, of the apparatus with the parts in the same position.

Mounted upon the top or cover plate of the machine is a compound slide comprising a sliding primary or base portion 32 having on its lower side a dove-tail 34 lying in a correspondingly shaped groove in the top plate of the machine. This slide has a transverse movement (see Fig. 1), being moved in one direction by a lever 36 pivoted at 38 to a yoke 40 carried by the base of the machine and provided with an anti-friction roller 42 which bears against the periphery of the cam 28. It is moved in the other direction by a spring 44 located between a portion of said slide and an abutment 46 secured to the cover plate, which spring acts also to hold the anti-friction roller 42 in engagement with the cam 28. Mounted upon this sliding base member 32 is a secondary slide 48 at right angles thereto (Figs. 2, 3 and 4). This slide is dovetail in shape and travels in a similarly shaped channel in the primary slide. This secondary slide 48 carries a clamp 50, the same being a swinging member adapted to swing over the body of a cord and securely clamp it to the secondary slide 48. The cord in the clamp 50 at the start is positioned so that after a slight movement to the right hereinafter described one free end lies within the circle of revolution of the end of the needle 12, while the other free end lies outside that circle.

The secondary slide 48 is reciprocated at right angles to the line of movement of the base member of the compound slide, being provided with a depending pin 52, the lower end of which extends into a slot in the arm 54 pivoted to the cover plate at 56 and carrying an anti-friction roller 58 which engages with the cam 30. This lever 54 is moved toward the cam 30 by a spring 60 so as to keep the anti-friction roller 58 in engagement with that cam. By this means a cord clamped to the secondary slide is given a compound series of movements due to the action of the cams 28 and 30.

Mounted upon the primary transversely moving slide 32 is a second clamping member composed of jaws 62 and 64 pivoted together at 66, the jaws being supplied with corresponding recesses 68, as shown on the upper jaw, in Fig. 2, so as to embrace a plurality of strands to be wound. The upper jaw is held in closed position by a latch 70 actuated by a spring 72 as shown in Fig. 3. The rear end of this spring extends over an angular projection 74 which acting upon the spring holds the movable jaw in open position when moved to that position. The opening between the jaws 62 and 64 is such as to closely surround the two strands of the cord, but not to rigidly clamp them, these strands in the operation of the machine being at times moved backward and forward between said jaws. The opening between these jaws is in the shape of a flattened funnel having its major axis horizontal, the rearward sides of the recesses 68 being flared and serving to guide any loose fiber of the sheathing, if the cord being wound has a sheath, to a point where they will be wound. This flaring opening also permits fingers 76 carried by the longitudinally moving slide to pass partially through the clamp 62 and 64 to assist in holding the cord and guiding its body into the flared funnel.

The lower member 64 of the funnel clamp referred to is provided with an opening which is adapted to permit the passage of the upper end of a finger 78 carried by an arm pivoted at 80 to the transverse slide 32. This finger has a rounded head which is engaged by a block 82 carried by a spring 84 secured to the cover plate, which spring tends to force the finger up to the position shown in Fig. 4. The lever carrying the finger 78 is provided with an inclined cam surface 86 which is adapted to be engaged by the point 88 of the longitudinally moving slide 48 so that when that slide is moved forward the lever together with its finger 78 is depressed, as shown in Fig. 5.

The needle 12 is what is known as a hollow needle, the thread passing into its forward end and out of its point as shown in Fig. 4. As it revolves, when the cord is in either of the positions shown in Figs. 6ª and 7ª, it passes between the two loose ends, and when the cord is in the position shown in Fig. 8ª it passes around both free ends. This needle is curved about 120° in a clockwise direction, as indicated in Figs. 6ª and 9ª, such clockwise curving being advantageous when the machine operates to revolve the needle clockwise, the curve assisting the needle in straightening the end or ends encircled by the path of the needle and in enabling the needle to find its way between the ends at times hereafter described.

The machine has a fixed starting and ending position and is automatically stopped in that position at the end of its cycle. The mechanism for securing this result comprises a lever arm 90 provided with a brake-shoe 92 which is adapted to engage the inner periphery of the grooved pulley 10, slightly before the stop 94 carried by the pulley engages the shoe. This slows down the pulley, which is driven through a slip drive (not shown) so as to reduce its speed before the pulley is brought to a positive stop. The stop 94, however, is brought into engagement with the shoe 92 at the end of every cycle so as to bring the machine to rest with the parts in a definite position, as shown in Figs. 1 to 4, the drive continuing to slip until the lever is again withdrawn from the stop. This lever 90 is actuated by a spring 98, which acts when the lever is released to apply the brake-shoe to the pulley 10. In order to retract the lever 90 and release the brake I provide an eccentric 100 actuated by the crank arm 102 which when turned raises the lever 90 and permits the machine to start. This lever is provided with a lug 104 which is adapted to be engaged by a shoulder 106 upon a detent 108 pivoted at 110 and actuated in one direction by the spring 112. The shaft 26, or rather the worm gear carried thereby is provided with a projection having an angular face 114 which engages an angular face 116 carried by the detent 108 so as to move it to the position shown in Fig. 4 and thus release the lever 90 permitting the brake to be applied.

In starting the machine the crank handle 102 is actuated to revolve the eccentric cam 100 and raise the lever 90 out of the path of the stop 94. This lever when raised is automatically held in raised position by the detent 108 and is held in that position until the detent is automatically knocked off by the projection carrying the angular face 114.

In the operation of the machine the thread is passed through the curved needle 12 and through the funnel shaped opening 68, shown in Fig. 4 and thereafter a cord is firmly clamped adjacent to its end to the longitudinally movable slide by the clamp 50, the ends of the cord protruding, as shown in Fig. 4, and the upper member 62 brought down. If the two members of the cord are surrounded by a sheath, the cord is so placed that the end of the sheath lies within the opening 68. After the clamping member 62 has been secured in position, the handle 102 is raised so as to raise the lever 90, whereupon the machine starts. After the pulley 10 has made a few revolutions the handle 102 is depressed, whereupon the machine continues to run, the lever being held in elevated position by the detent 108 which has by this time been released by the projection 114.

When the machine is in its initial starting position the roller 42 is at the very beginning of a drop on the cam 28 as shown in Fig. 9. As soon, therefore, as the machine starts, the primary slide 32 is moved slightly to the right, this movement taking place during the first half turn of the needle, and brings the right hand end outside the circle described by the needle while the left hand strand remains within it, so that the needle as it makes its initial revolution passes upward outside the left hand strand and then down between the strands as indicated in Fig. 6ª. As the winding proceeds, the longitudinally moving or secondary slide is retracted by the action of the cam 30 so as to draw the cord backward through the guide clamp 62—64. This movement on account of the shape of the cam 30 is a relatively fast movement, during four revolutions of the needle producing four open turns in the resulting wind, and brings the winding to a point just beyond the position shown in Fig. 6. When the winding reaches that point the action of the cam 30 acts to reverse the longitudinal movement of the slide 32 and to slow it up so that the needle makes four close turns at that point, whose helices successively approach the point of separation of said free ends, as shown in the various Figs. 5 to 9. Thereupon the cord and cam 30 acts to continue to move the cord in the reverse direction at a relatively rapid rate until the needle has made four more turns which are open and complete the winding of the left leg.

After the winding of the left leg the cam 28 acts to move the transversely moving slide 32 to the left so that the needle as it revolves on its next downward movement passes downwardly on the right hand strand and on its upward stroke passes between the two legs, the left leg having been moved out of the circle of revolution described by the end of the needle and the right leg having been moved into that circle, and in its continued operation winds the thread around the right hand leg only. The cam 30 because of its configuration acts to produce the same longitudinal movement of the cord so as to make four widely spaced turns outward, followed by four closely spaced turns and four widely spaced turns inward. The four tightly spaced turns are in each instance applied during a slow movement of the cord toward the needle, this overlying a part of an open helix and giving a better finish to the product.

After the windings of both legs have been completed, as shown in Fig. 8, the cam 28 permits the spring 44 to move the slide 32 so as to place the axis of the cord in a central or intermediate position, within the circle described by the needle, as shown in Figs. 8 and 8ª, so that when the needle 12 revolves it wraps the thread around both strands of the cord. After the cord has been moved to this position the cam 30 permits the spring 60 to move the secondary slide forward toward the needle at a relatively rapid rate for a short distance, preferably one-half the distance of the open windings on the free ends, which movement of the slide retracts the finger 78 so as to keep it out of the way of the sheath, as shown at Fig. 5. The cam 30 then acts to gradually move the cord away from the needle, whereupon the needle makes close windings about the two strands and also about the sheath if a sheath is present, as shown in Fig. 9, which brings the machine to the initial position at which the stop 94 upon the pulley engages the shoe 92, bringing the machine to rest, the brake having been applied just before that time by the knocking off of the detent 108.

The cord is then removed from the machine and another cord inserted and the operation repeated, it being unnecessary to sever the winding cord for this purpose. It is the practice to wind some twenty-five cord ends without severing the connecting thread. After a plurality of cords are thus wound the connecting thread is then severed and the ends secured in any suitable manner, as for instance by drawing the loose end of the thread under some of the windings or by stitching the loose end down by stitches passing between the two strands My machine is particularly adapted for finishing the ends of conducting heater cords, the windings of the two legs being somewhat remote from the extreme ends of those legs. The insulation on the extreme portions of the free ends is subsequently stripped off so as to expose the copper conductors, in the usual manner.

The head of the needle is somewhat tapering when looked at end on, and the opening therein through which the thread passes is preferably through the enlarged portion of the head. The inner curved side of the needle is moreover somewhat flattened, as shown in Fig. 1, and also in Figs. 7 to 9, so as to more easily sweep around the end portion being wound. With this curved needle both the point and the end which is secured to the hollow shaft 8 are made eccentric with the axis of that shaft, as shown in Fig. 4 and Figs. 6ª to 9ª. The eye of the needle through which the thread is discharged is located closely adjacent to the forward side of the guide jaws 62 and 64, as shown in Figs. 1 and 4 and 6 to 9.

The method herein described of winding cord ends can be performed mechanically instead of manually and constitutes an important part of my invention. The apparatus which I have herein disclosed for carrying it out enables the work to be done much more rapidly than by hand and with very little manual effort, and is particularly desirable inasmuch as it is difficult to secure manual labor to wind cord ends in any way, since persons winding cords must be very deft and furthermore the handling of the thread by such a person is liable to render the fingers of a beginner sore or tender so that it is difficult to find those who are willing to take up and pursue this line of work.

Before the invention of my method of winding it was customary to wind each end separately, tying the ends of the windings upon the two separate ends and then to wind the body of the cord and tie the ends of the winding thereon, making it necessary in a two-strand conductor to apply three separate windings and to tie three knots, one for each winding. By my invention it becomes necessary to secure only one free end, and furthermore the method as above described is adapted to be carried out mechanically by the machine described.

The product produced by the method and machine is a new product and where a two ended cord is employed consists of a cord having a winding starting at the point of juncture of the two free ends and continuously extending outwardly along one end and then inwardly along said end to said point, and then outwardly along the other end and inwardly along the other end to said point and then around the body of the cord. Furthermore, in this product the turns located at the ends of the outward traverse upon the ends are close together and the turns about the body of the cord are close together, the intermediate turns being spaced apart, the thread composing the winding upon all of the several portions being one continuous thread.

The starting end of the thread which is laid adjacent to the separating point of the end portions extends beneath the finishing windings so as to be bound thereby. In operating the machine it is preferably pulled through and into the groove 65 behind the clamping member 62. The closely laid helices in each instance preferably overlie more open helices of the preceding traverse as shown.

The product is clearly shown in Figs. 9 and 10 of the drawing, the cord there shown being also provided with a sheath.

Fig. 10 shows the end of a two-strand heater cord having two conductors each separately surrounded by insulation, the ends of the conductor being freed from insulation so as to be connected to binding posts, the same being of ordinary construction except for the winding which is applied in accordance with my invention in place of the ordinary securing means heretofore used. There is also present a sheath surrounding both strands which may or may not be used as desired.

In Fig. 10, 118 is a cord having two strands. 120 is a braided or otherwise formed sheath surrounding said strands. 124 and 126 are the exposed free ends of said strands which are separable after the end portion of the sheath has been removed. 128 is a winding which is preferably of non-conducting material, and consists of a continuous thread which starts on the left leg adjacent to the sheath and extends around and outwardly along said left leg, the turns being spaced apart as it proceeds along said leg, as shown in Fig. 6, and being later brought close together and then spaced apart as it returns along said leg, as shown in Fig. 7, and then extends outwardly around the right leg and inwardly around said right leg in a similar manner, as shown in Fig. 8, and then around the body portion of the cord adjacent to its initial point as shown in Fig. 12 and Fig. 9 where it is secured in any suitable manner.

In Fig. 10 the asbestos covering at 130 (Fig. 12) has been stripped from the two ends of the conducting cores 132 after the winding has been completed so as to leave the same free to be connected to binding posts in the usual manner.

In order to fasten the free end of the winding that end is drawn through the body of the cord as shown at 134 in Fig. 11 by a suitable hook.

Fig. 12 shows the open winding 136 about the body of the cord, which is subsequently covered by the close final windings.

While the machine described is particularly adapted to finish the ends of cords having two free ends, the use of the invention is not confined to dealing with such two ended cords. Various novel features disclosed herein and embodying my invention may be utilized to finish cords other than two ended cords.

As will be evident to those skilled in the art, my invention permits of various modifications without departing from the spirit thereof or the scope of the appended claims.

What I claim is:

1. In a machine of the character described for winding cords having two free ends, the combination of a revolvable needle having its eye eccentric to its axis of revolution, means for revolving said needle, means for clamping a cord having a plurality of free ends so that the axes of said ends may be one at a time within the circle described by the eccentric end of the needle, means for moving said clamping means so as to move the end of the cord longitudinally relatively toward and from said needle a plurality of times, and means for shifting the cord transversely between two complete reciprocations of said cord so that the circle described by the end of said needle first embraces one free end only and then the other only.

2. In a machine of the character described for winding cords having two free ends, the combination of a revolvable needle having its eye eccentric to its axis of revolution, means for revolving said needle, means for clamping a cord having a plurality of free ends so that the axes of said ends may be one at a time within the circle described by the eccentric end of the needle, means for moving said clamping means so as to move the end of the cord longitudinally relatively toward and from said needle a plurality of times, and means for shifting the clamp transversely between two complete reciprocations of said cord so that the circle described by said needle first surrounds one free end only and then surrounds the other only, said means acting to thereafter shift said clamp so as to bring all of the strands of said cord within the circle of revolution of the end of said needle and to further move said cord relatively to said needle so as to cause said revolving needle to place a winding around the body of said cord.

3. In a machine of the character described for winding cords having two free ends, the combination of a revolvable needle having its eye eccentric to its axis of revolution, means for revolving said needle, means for clamping a cord having a plurality of free ends so that the axes of said ends may be one at a time within the circle described by the eccentric end of the needle, means for moving the end of the cord longitudinally relatively toward and from said needle a plurality of times, and means for shifting the cord transversely between two complete reciprocations of said cord so that said needle first winds one free end and then winds the other, said means acting to thereafter shift said cord so as to bring all of its strands within the circle of revolution of the end of said needle and to further move said cord relatively to said needle so as to cause said needle to place a winding around the body of said cord, said cord moving means acting to move said cord longitudinally while the ends are being wound a greater distance for a given number of turns of said needle than said cord is being moved during the period when said body portion is being wound.

4. In a machine of the character described for winding cords having two free ends, the combination of a revolvable needle having its eye eccentric to its axis of revolution, means for revolving said needle, means for clamping a cord having a plurality of free ends so that the axes of said ends may be one at a time within the circle described by the eccentric end of the needle, means for moving the end of the cord longitudinally relatively toward and from said needle a plurality of times, and means for shifting the cord transversely between two complete reciprocations of said cord so that said needle first winds one free end and then winds the other, said means acting to thereafter shift said cord so as to bring all of its strands within the circle of revolution of the end of said needle and to further move said cord relatively to said needle so as to cause said needle to place a winding around the body of said cord, said means acting to move said cord axially at a comparatively rapid rate while the intermediate portions of said winding are being applied and at a slower rate while the other portions are being applied.

5. In a machine of the character described the combination of a needle revolvable about an axis and having its eye end eccentric to said axis, means for revolving said needle about said axis, a cord clamp having a compound movement, said clamp being mounted upon a slide movable to and fro parallel to the axis of revolution of said needle, a slide carrying said first slide and movable transversely to said axis, and means for moving said slides in said directions.

6. In a machine of the character described the combination of a needle revolvable about an axis and having its eye end eccentric to said axis, and means for revolving said needle about said axis, means for revolving said needle, a cord clamp having a compound movement, said clamp being mounted upon a slide movable to and fro to the axis of revolution of said needle, a slide carrying said first slide and movable transversely to said axis, and means for moving said slides, and a guide located adjacent to the eye of said needle and carried by said transversely movable guide.

7. In a machine of the character described the combination of a needle revolving about an axis and having its eye end eccentric to said axis, and means for revolving said needle about said axis, a cord clamp having a compound movement, said clamp being mounted upon a slide movable to and fro parallel to the axis of revolution of said needle, a slide carrying said first slide and movable transversely to said axis, and means for moving said slides to and fro in said directions, a guide located adjacent to the eye of said needle and carried by said transversely moving guide, and a separating and indexing finger carried by said transversely moving guide adapted to pass between the two ends of a two ended cord being wound, and adapted to be retracted by said first movable slide.

8. In a machine of the character described the combination of a needle revolving about an axis and having its eye end eccentric to said axis, means for revolving said needle about said axis, a cord clamp having a compound movement, said clamp being mounted upon a slide movable to and fro parallel to the axis of revolution of said needle, a slide carrying said first slide and movable transversely to said axis, and means for moving said slide to and fro, a guide located adjacent to the eye of said needle and carried by said transversely moving guide, and a separating and indexing finger carried by said transversely moving guide adapted to pass between the two ends of a two ended cord being wound, said finger and said first slide having cam surfaces whereby said first slide retracts said separating finger when said first slide moves forward from its initial position.

9. In a machine of the character described the combination of a needle revolving about an axis and having its eye end eccentric to said axis, means for revolving said needle about said axis, a cord clamp having a compound movement, said clamp being mounted upon a slide movable to and fro parallel to the axis of revolution of said needle, a slide carrying said first slide and movable transversely to said axis, and means for moving said slides to and fro, said slide moving means comprising a cam and a lever actuated by said cam and engaging said transversely moving slide and a second cam and a lever actuated by said second cam and engaging said first slide, said cams being in timed relation.

10. In a machine of the character described the combination of a revolving needle, the eye of said needle being eccentric to its axis of revolution, means for clamping a cord so that the axis of its end to be wound is within the circle described by the eye of said needle, and means for moving said clamped end longitudinally relatively to said needle, slip driving means for revolving said needle and a stop movement adapted to stop said driving means at a predetermined point, said stop movement comprising a lever adapted to engage a stop operatively connected to said needle, means for retracting said stop, a detent holding the same in retracted position, and means for withdrawing said detent so as to permit said lever to engage said stop.

11. In a machine of the character described the combination of a revolving needle, the eye of said needle being eccentric to its axis of revolution, means for clamping a cord so that the axis of its end to be wound is within the circle described by the eye of said needle, and means for moving said clamped end longitudinally relatively to said needle, slip driving means for revolving said needle, and a stop movement adapted to stop said driving means at a predetermined point, said stop movement comprising a lever adapted to engage a stop rigidly connected to said needle, means for retracting said stop, a detent holding the same in retracted position, and means for withdrawing said detent so as to permit said lever to engage said stop, said slide actuating means comprising two cams mounted to rotate together about the same axis and said detent withdrawing means being connected to said cams.

EDWIN E. WAITE.